Patented Dec. 31, 1946

2,413,312

UNITED STATES PATENT OFFICE 2,413,312

CATALYTIC FINISHING OF GASOLINES

Robert M. Cole, Oakland, Calif., assignor to Shell Development Company, San Francisco, Calif., a corporation of Delaware No Drawing. Application January 26, 1945, Serial No. 574,755

5 Claims. (Cl. 196—28)

This invention relates to the treatment of thermally cracked gasolines, catalytically cracked gasolines, thermally reformed gasolines, and similar materials of the gasoline boiling range containing substantial amounts of olefins and other unsaturated bodies and other impurities such as sulfur compounds, nitrogen compounds, etc., to effect a substantial desulfurization and to remove or render innocuous various gum-forming bodies. More particularly the invention relates to the treatment of such materials by the combined action of hydrogen and catalysts under such conditions and in such a manner as to afford the desired finishing or refining treatment with a minimum loss of material, minimum consumption of hydrogen and with substantially no depreciation of the anti-knock characteristics of the original material.

In my copending application Serial No. 569,234, filed December 21, 1944, of which this application is a continuation-in-part, I have described an improved process for the treatment of various sulfur-bearing gasoline stocks including various cracked and reformed stocks with hydrogen for the primary purpose of effecting desulfurization thereof without loss of anti-knock properties. The process of said copending application is restricted to the treatment of such stocks as contain more than 0.10% sulfur and is restricted to the use of particular catalysts. The process of the present invention is an improved process directed specifically to the treatment of unsaturated gasoline fractions such in particular as cracked and reformed gasolines in a different and particular manner to achieve the above mentioned objects. The material treated may or may not contain more than 0.10% sulfur. Also, other catalysts than those specified in the above mentioned copending application may be used. When treating such cracked stocks containing more than 0.10% sulfur with the particular catalysts specified in said copending application according to the process of the present invention, however, the process depends in part upon the principles disclosed in said copending application.

Gasolines produced by thermal cracking, gasolines produced by catalytic cracking, and gasolines produced by thermal reforming of various gasoline stocks usually have the following characteristics: They contain appreciable quantities of olefins and other unsaturated bodies and consequently have a high bromine number and high acid heat. They contain appreciable quantities of aromatics and naphthenes. They have relatively good anti-knock characteristics. They contain appreciable amounts of sulfur compounds, nitrogen compounds, and other impurities. They have poor color stability, poor gum stability and poor lead susceptibility. Consequently these stocks generally require some sort of finishing treatment to make them acceptable for use in gasoline of present-day quality. The conventional method of refining these materials is the conventional sulfuric acid treatment followed by a Doctor treatment and rerunning. This method has the recognized disadvantages of incomplete sulfur removal, high acid consumption, poor yields, and an appreciable depreciation of anti-knock properties. In view of these disadvantages considerable attention has been given to the catalytic finishing of such materials by catalytic hydrogenation. Certain such processes have been proposed. However, the proposed processes have certain disadvantages and furthermore are too costly to make their use economical except in the special case of preparation of substantially saturated blending materials for premium grade aviation gasoline.

The present process provides a means for effecting excellent desulfurization and refining while affording a product of excellent anti-knock characteristics. These desirable results are furthermore obtained with a minimum consumption of hydrogen and with improved catalyst life. Consequently the process of the invention is applicable and particularly advantageous for the catalytic finishing of motor gasolines of substantially full boiling range and similar non-premium products.

The process of the invention in its broader more general aspect comprises treating the gasoline in the presence of an excess of hydrogen and a sulf-active hydrogenation catalyst at a temperature between about 400° F. and 825° F. under conditions adjusted to give only a partial desulfurization and to hydrogenate only a minor part of the olefins, separating the partially desulfurized material into a lower boiling fraction and a higher boiling fraction, treating the higher boiling fraction in the presence of an excess of hydrogen and a sulf-active hydrogenation-dehydrogenation catalyst at a temperature between about 850° F. and 1000° F. under conditions adjusted to effect substantial desulfurization and substantial saturation of olefins, and blending the product of the latter treatment with the lower boiling fraction to produce an olefin-containing desulfurized finished gasoline having an octane number at least as high as that of the original starting material. In a more specific embodiment of the process at least the major portion of the hydrogen required for the first, or low temperature, treating step is obtained from the second, or high temperature, treating step. In a further more particular embodiment the conditions in the first, or low temperature, treating step and the cut point in the separation are adjusted such that the higher boiling fraction of the product of the first step contains in the order of 0.10% sulfur and catalysts of a particular type are employed in the second, or high temperature, treating step.

The process is generally applicable for the catalytic finishing of various sulfur and olefin-containing distillates such as motor gasolines obtained from thermal cracking, thermal reforming, catalytic cracking and similar high temperature treatments, and is designed to refine or finish such materials to the extent of effecting a substantial desulfurization and rendering them acceptable with respect to such properties as lead susceptibility, gum-forming tendency and color. The treatment, however, is not designed to give a substantially saturated product having a low acid heat and is not recommended for the production of premium grade aviation gasoline. On the other hand, the treatment is designed to produce stable acceptable products having large amounts of olefins, such as desired for motor gasoline. The material treated may be a full range gasoline or it may be a gasoline blending stock boiling essentially in the gasoline boiling range.

The material to be treated is first mixed with a large excess of hydrogen and subjected to a very mild desulfurization-hydrogenation treatment in the presence of a sulf-active hydrogenation catalyst. In general the amount of hydrogen employed is between about 5 and 30 moles per mole of the hydrocarbon feed. The pressure is usually between about 200 and 1000 p. s. i. Any of the many known sulf-active hydrogenation catalysts may be employed in this step. Examples of such suitable catalysts are the oxides and sulfides of V, Cr, Mn, Fe, Co, Ni, Mo, W. The temperature in this step is maintained between about 400° F. and 825° F. Within this temperature range the lower temperatures consistent with the activity of the catalyst and the other treating conditions are preferred. Thus, in general, with a catalyst of average activity a temperature in the neighborhood of 500–600° F. is generally preferred. Under these conditions the material tends to become completely hydrogenated to a saturated non-aromatic product of low octane number. This is prevented, however, by effecting the treatment at such a rate that only a superficial hydrogenation is effected. This superficial hydrogenation under these relatively drastic conditions effects a substantially complete removal of gum and color-forming bodies and effects a partial removal of sulfur compounds and nitrogen compounds, but hydrogenates only a small amount of the olefins present and does not attack the aromatic hydrocarbons at all. The extent of this treatment is adjusted, preferably by controlling the throughput rate and/or the temperature to one of the following criteria or indexes of treatment, depending upon the sulfur content of the feed stock, the cut point in the following separation, and the type of catalyst used in the second, or high temperature, treating step. (1) The conditions are adjusted such that the sulfur content of the 100–300° F. fraction of the product is about 0.10%. (2) The conditions are adjusted such that the sulfur content of the 300–400° F. fraction of the product is 0.10% or slightly below 0.10%. The first index is preferably used when a catalyst other than a sulfide of a metal of the iron group is used in the second, or high temperature, treatment and the second index is preferably used when the catalyst in the second, or high temperature, treatment is a sulfide of a metal of the iron group.

The partially desulfurized material from the above-described low temperature treatment is separated into a lower boiling olefinic fraction and a higher boiling olefinic fraction. The separation may be effected at any convenient point according to the character of the material, but the split between the fraction is preferably made between 200° F. and 300° F. When employing a sulfide of a metal of the iron group as the catalyst in the second, or high temperature, treatment the split is preferably made such that the higher boiling fraction contains about 0.10% sulfur. Otherwise the split is preferably made at the higher end of the range consistent with a satisfactory sulfur content of the lower boiling fractions.

The higher boiling fraction is then treated with an excess of hydrogen and a sulf-active hydrogenation-dehydrogenation catalyst at a temperature in the range of 850° F. and 1000° F. A large excess of hydrogen such as from 5 to 30 moles per mole of hydrocarbon is recommended. The pressure is usually between about 500 and 1100 p. s. i. The catalyst used in this step may be any one of the known sulf-active hydrogenation-dehydrogenation catalysts. However, in order to afford a substantially continuous operation a sulfide catalyst is preferred. Particularly suitable catalysts comprise a sulfide of a metal of the iron group, if desired in combination with a sulfide of a metal of group VI of the periodic system of the elements. Examples of such catalysts are nickel sulfide, iron sulfide and cobalt sulfide, alone and in combination with sulfides of molybdenum or tungsten. These catalysts may be used substantially continuously in the present process for hundreds of hours without regeneration. Furthermore, they are particularly efficient in effecting reactions leading to the production of increased amounts of aromatic hydrocarbons in the product. When using these preferred catalysts the first, or low temperature, treatment and/or the fractionation are adjusted so that the feed to the second, or high temperature, treatment contains not more than about 0.10% sulfur.

The high temperature treatment is carried out relatively slowly, liquid hourly space velocities in the order of 0.5 to 3 being typical. Under these conditions the olefins are substantially hydrogenated, further desulfurization is effected, and considerable dehydrogenation of hydroaromatic naphthenes takes place.

In the second, or high temperature treatment appreciable amounts of hydrogen are produced by the dehydrogenation of naphthenic constituents. This hydrogen provides a considerable portion of the hydrogen required for the treatment and in some cases may supply hydrogen also for the first, or low temperature, treatment. The hydrogen gas recycled to the treatments to maintain the desired excess hydrogen may be treated by conventional methods to remove the hydrogen sulfide formed in the process. An advantageous cycle is, for example, to pass the hydrogen gas separated from the product of the second, or high temperature, treatment to the first, or low temperature, treatment; treat the hydrogen gas separated from the low temperature treatment to remove hydrogen sulfide; and to cycle the hydrogen from the hydrogen sulfide removal step to the second, or high temperature, treatment. When operating in this manner, it is advantageous to add any fresh hydrogen required to the second, or high temperature, cycle.

The product of the high temperature treatment is reblended with the lower boiling fraction. The blend, or the separate fractions, may be caustic washed to remove traces of hydrogen sulfide. The blended product normally meets all of the usual requirement regarding gum stability, color, etc. It has an octane number (A. S. T. M.) at least as good as that of the original feed and usually considerably better. Also the lead susceptibility is greatly improved. The hydrogen consumption is generally very small since only a portion of the olefins are saturated. The yield of product, based on the feed, is in the order of 96-99%.

It will be noted that in the above-described process the higher boiling portion of the feed is treated twice under different conditions. The first treatment of this material is effected at a low temperature in the presence of the lower boiling portion of the feed and the second is effected at a higher temperature in the absence of the lower boiling portion of the feed. This particular manner of operation is found to give results which are much superior to various alternative one and two step processes such, for example, as the following: (1) treating all of the material under the low temperature conditions as in step one, (2) treating all of the material under the high temperature conditions as in step 2, (3) treating all of the material under the low temperature conditions as in step 1 followed by treating all the material under the high temperature conditions as in step 2, (4) treating the higher boiling portion of the feed under the low temperature conditions as in step 1 and treating the lower boiling portion of the feed under the higher temperature conditions as in step 2, (5) treating the lower boiling material alone as in step 1 and treating the higher boiling material alone as in step 2.

I claim as my invention:

1. Process for the catalytic finishing of sulfur-containing olefinic gasolines which comprises treating the gasoline in the presence of an excess of hydrogen and a sulf-active hydrogenation catalyst at a temperature between about 400° F. and 825° F. under conditions chosen to effect only a partial desulfurization and to hydrogenate only a minor part of the olefins, separating said partially desulfurized material into a lower boiling olefinic fraction and a higher boiling olefinic fraction, treating said higher boiling fraction in the presence of an excess of hydrogen and a sulf-active hydrogenation-dehydrogenation catalyst at a temperature between about 850° F. and 1000° F. under conditions chosen to effect substantial further desulfurization and substantial saturation of olefins, and blending the product of said second treatment with said lower boiling fraction to produce a refined olefinic gasoline having an octane number at least as high as the original starting material.

2. Process according to claim 1 in which a sulfide of a metal of the iron group is employed as a catalyst in the second or higher temperature treatment.

3. Process according to claim 1 in which a combination nickel sulfide-tungsten sulfide catalyst is employed in the second or higher temperature treatment.

4. Process according to claim 1 in which the split between the lower and the higher boiling fractions is made between 200° F. and 300° F.

5. Process according to claim 1 in which the severity in the first or lower temperature treatment is adjusted so that the sulfur content of the higher boiling fraction is about 0.10%.

ROBERT M. COLE.